Nov. 22, 1938.　　J. B. KELLEY ET AL　　2,137,964
COUPLING
Filed May 12, 1937
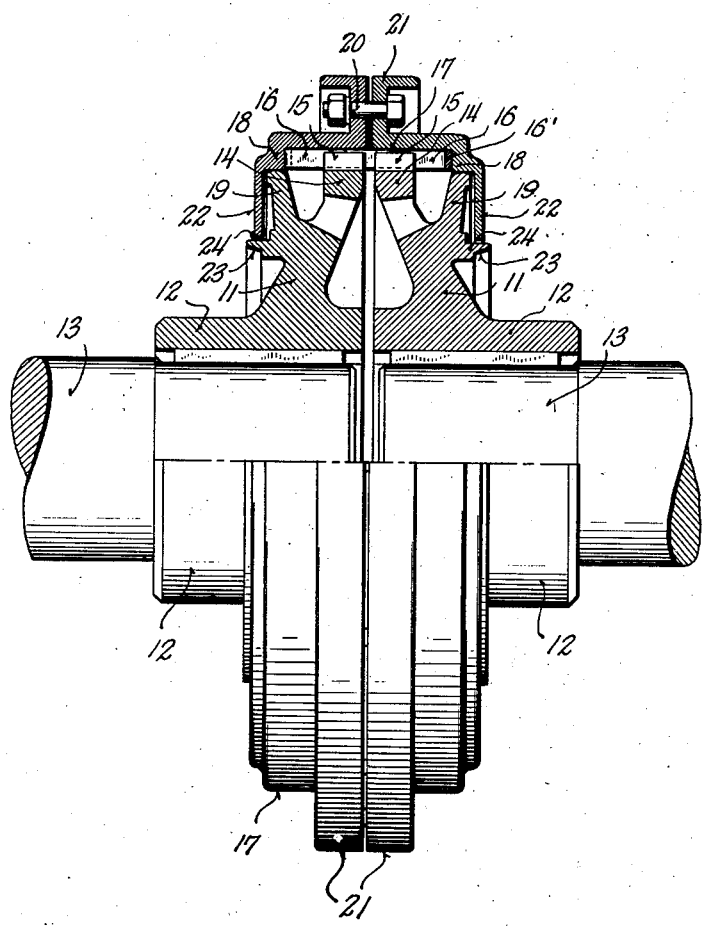
INVENTORS.
JAMES B. KELLEY
BY　WALTER P. SCHMITTER
ATTORNEY.

Patented Nov. 22, 1938

2,137,964

UNITED STATES PATENT OFFICE 2,137,964

COUPLING

James B. Kelley and Walter P. Schmitter, Milwaukee, Wis., assignors to The Falk Corporation, Milwaukee, Wis., a corporation of Wisconsin Application May 12, 1937, Serial No. 142,121

8 Claims. (Cl. 64—15)

This invention relates to power transmission couplings of the torsionally resilient type, wherein the torque is transmitted from one coupling disk to the other through a series of parallel resilient members engaged in slots formed in the disks.

A coupling of this type is disclosed in Patent No. 2,027,842 to Walter P. Schmitter and Percy C. Day. In the coupling therein shown, the resilient torque transmitting members are confined and positioned by an enclosing lubricant retainer shell or housing in peripheral contact with and centered by the slotted portions of the disks, so that the shell or housing tilts and adjusts the members relative to both disks in a manner to better accommodate them to angular or parallel misalignment between the disks.

That arrangement has proven very satisfactory, particularly in couplings of average size or smaller. In couplings of this type a rather close positional relation between the slotted portions of the disks is desirable, but that condition, in an arrangement such as that just described, causes the shell or housing to tilt to an undesirable degree in couplings of larger size, particularly when such tilt is the result of parallel misalignment.

An object of the present invention is to reduce the degree of tilt of the shell or housing induced by parallel misalignment in couplings of the character mentioned. This we have accomplished by the provision of a novel combination and arrangement of parts whereby the shell or housing is floatably supported substantially at its ends by widely spaced means disposed axially beyond the slotted portions of the disks.

Other objects and advantages will appear, expressed or implied, from the following description of an illustrative embodiment of the present invention.

The single figure of the accompanying drawing is a view partly in axial section and partly in elevation of a coupling constructed in accordance with the present invention.

The coupling shown is similar in many respects to that shown in the patent above identified. It comprises a pair of disks 11 having integral hubs 12 keyed or otherwise fixed to the adjacent ends of shafts 13, either of which may be a driving shaft and the other a driven shaft. Each disk also has a peripheral portion 14 spaced slightly from that of the other disk and having slots 15 formed therein in substantial alignment with corresponding slots in the other disk. The disks are connected by a series of resilient strips or limbs 16 each engaged in slots of both disks and preferably interconnected at their ends 16' in a manner to form a grid-like member substantially similar to that disclosed in the above identified patent.

The grid-like member, with its limbs 16, is seated against the interior of an enclosing lubricant retainer housing 17 and confined between internal end shoulders 18 formed therein. In this instance the housing 17 is supported at its ends by rings 19 which project radially outward from the disks 11 and which are disposed axially beyond the slotted portions 14 of the disks. The rings 19 are preferably of a diameter to fit loosely within the circular end shoulders 18 of the housing and their outer peripheries are preferably transversely curved to accommodate a tilting or rocking of the housing 17 thereon.

It will of course be understood that any radial displacement of the disks, with their rings 19, resulting from parallel misalignment of the shafts, will cause the housing 17 to tilt with respect to both disks, and that, due to the wide spacing of the rings 19, the degree of tilt is reduced to a minimum. It will be noted that the slotted portions 14 of the disks are of such diameter as to provide ample clearance between them and the housing 17 so as to permit such relative radial displacement between the disks without interfering with the housing or the tilting action thereof.

To facilitate assembly and dismantling of parts, the housing 17 is preferably formed in two halves axially separable along a mid-plane and suitably joined by bolts 20 or the like passed through appropriate flanges 21.

In order to function as a lubricant retainer, the housing is provided with inwardly directed radial end flanges 22, which in this instance extend only part way toward the coupling hubs 12 and which cooperate with appropriate flanges 23 that extend axially from the disks 11 to substantially close the housing. By this arrangement the radial depth of the end flanges 22 may be reduced and consequently the extent of movement of their inner edges 24, resulting from tilting of the housing, correspondingly reduced.

It will also be noted that the inner edge 24 of each end flange 22 is very close to that radial plane which passes through the point of contact of the housing 17 with the adjacent ring 19, so that as the housing rocks on that ring as a fulcrum, the edge 24 moves substantially parallel to the flange 23 rather than toward or from it.

This permits the required clearance between each flange 22 and cooperating flange 23 to be reduced to a desirable minimum. Of course adequate clearance is provided between each end flange 22 and its adjacent ring 19 to accommodate tilting of the flange and its housing with respect to the ring 19.

Various changes may be made in the embodiment of the invention hereinabove specifically described without departing from or sacrificing the advantages of the invention as defined in the appended claims.

We claim:

1. A coupling comprising a pair of coupling disks having slotted portions, a lubricant retainer housing surrounding said disks and tiltable relative to both of them, a series of torque transmitting members engaged in said slotted portions and confined by said housing to tilt therewith, and means supporting said housing at points disposed axially beyond said slotted portions to sustain said housing clear of said slotted portions.

2. A coupling comprising a pair of coupling disks having peripheral slotted portions, a series of members engaged in said slotted portions and forming a torque transmitting medium therebetween, a lubricant retainer housing surrounding said disks and members and tiltable relative to both of said disks, and means supporting said housing at points disposed axially beyond said slotted portions to sustain said housing clear of said slotted portions.

3. A coupling comprising a pair of coupling members having peripheral slotted portions, torque transmitting means engaged in said slotted portions, a lubricant retainer housing surrounding said disks and tiltable relative to both of them, and means on said members disposed axially beyond said slotted portions for supporting and centering the ends of said housing.

4. A coupling comprising a pair of opposed coupling members having slotted peripheral portions upon their adjacent ends, torque transmitting means engaged with said slotted portions, a lubricant retainer housing surrounding said members and tiltable relative to both of them, and means on said members engaging said housing near the ends thereof for supporting and centering said housing and for sustaining the intermediate portion of said housing clear of said members.

5. A coupling comprising a pair of opposed coupling members having slotted peripheral portions upon their adjacent ends, a lubricant retainer housing surrounding said members and tiltable relative to both of them, means engaged with said slotted portions for transmitting torque from one of said members to the other independently of said housing, said torque transmitting means being confined by said housing to tilt therewith, and means coacting with the opposite ends of the housing to separately support and center said ends and to sustain the intermediate portion of said housing out of contact with said members.

6. A coupling comprising a pair of coupling members having slotted peripheral portions, a housing surrounding said portions and tiltable relative to both of them, a resilient grid-like torque transmitting member engaged in said slotted portions and confined by said housing to tilt therewith, and means on said members cooperating with the opposite ends of said housing to separately support and center said ends and to sustain said housing clear of said slotted portions.

7. A coupling comprising a pair of coupling members having slotted peripheral portions, a housing surrounding said portions and tiltable relative to both of them, a series of resilient elements engaged in said slotted portions to transmit torque from one to the other independently of said housing, internal end shoulders in said housing confining said series of elements to tilt as a unit with said housing, and means coacting with said shoulders beyond the ends of said elements to support and center the housing ends.

8. A coupling comprising a pair of coupling members having mounting hubs and having slotted peripheral portions, a lubricant retainer housing surrounding said members and tiltable with respect to both of them, means engaged with said slotted portions for transmitting torque from one of said members to the other independently of said housing, separate supports for the opposite ends of said housing, inwardly directed flanges at the opposite ends of said housing, and means projecting axially from said members through said flanges at a point radially distant from said hubs and cooperating with said flanges to substantially close said housing.

JAMES B. KELLEY.
WALTER P. SCHMITTER.